United States Patent
Swallow

(10) Patent No.: US 9,574,474 B2
(45) Date of Patent: Feb. 21, 2017

(54) CONTROL OF EMISSIONS

(75) Inventor: Daniel Swallow, Sandy (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 13/583,016

(22) PCT Filed: Mar. 7, 2011

(86) PCT No.: PCT/IB2011/000491
§ 371 (c)(1),
(2), (4) Date: Sep. 6, 2012

(87) PCT Pub. No.: WO2011/110919
PCT Pub. Date: Sep. 15, 2011

(65) Prior Publication Data
US 2012/0324867 A1  Dec. 27, 2012

(30) Foreign Application Priority Data
Mar. 8, 2010 (GB) .................................. 1003784.4

(51) Int. Cl.
| | |
|---|---|
| *F01N 3/10* | (2006.01) |
| *F01N 3/023* | (2006.01) |
| *B01D 53/94* | (2006.01) |
| *F01N 3/035* | (2006.01) |
| *F01N 3/20* | (2006.01) |
| *B01J 29/85* | (2006.01) |

(52) U.S. Cl.
CPC ......... *F01N 3/0231* (2013.01); *B01D 53/9418* (2013.01); *F01N 3/035* (2013.01); *F01N 3/2066* (2013.01); *B01D 53/9468* (2013.01); *B01D 2253/116* (2013.01); *B01D 2255/9155* (2013.01); *B01D 2258/012* (2013.01); *B01J 29/85* (2013.01); *F01N 2510/10* (2013.01); *F01N 2570/18* (2013.01); *F01N 2610/02* (2013.01); *Y02T 10/24* (2013.01)

(58) Field of Classification Search
CPC .......................... F01N 2350/00; B01D 2253/25
USPC ......... 60/274, 295, 297, 299, 301, 303, 311; 422/169–180
See application file for complete search history.

(56) References Cited

U.S. PATENT DOCUMENTS

| | | | |
|---|---|---|---|
| 5,776,417 A | 7/1998 | Frost et al. | |
| 5,939,028 A | 8/1999 | Bennett et al. | |
| 7,673,448 B2* | 3/2010 | Voss et al. | 60/297 |
| 7,722,829 B2* | 5/2010 | Punke et al. | 422/180 |
| 7,856,809 B2* | 12/2010 | During | 60/295 |
| 8,236,248 B2* | 8/2012 | Doring | B01D 53/9431 422/170 |
| 8,246,922 B2* | 8/2012 | Boorse et al. | 423/213.2 |
| 8,448,424 B2* | 5/2013 | Huang et al. | 60/286 |
| 8,524,182 B2* | 9/2013 | Grubert et al. | 423/213.2 |
| 8,544,260 B2* | 10/2013 | Boorse et al. | 60/299 |
| 8,591,820 B2* | 11/2013 | Boger et al. | 422/180 |
| 8,601,796 B2 | 12/2013 | Hinz et al. | |
| 8,709,365 B2* | 4/2014 | Dornhaus et al. | 423/213.5 |
| 8,795,617 B2* | 8/2014 | Swallow et al. | 423/213.2 |
| 2004/0040289 A1 | 3/2004 | Mazur et al. | |
| 2006/0133969 A1 | 6/2006 | Chiffey et al. | |
| 2009/0031702 A1 | 2/2009 | Robel | |
| 2010/0275579 A1 | 11/2010 | Klingmann et al. | |
| 2011/0173951 A1 | 7/2011 | Spurk et al. | |

FOREIGN PATENT DOCUMENTS

| | | |
|---|---|---|
| CN | 101457681 A | 6/2009 |
| CN | 101629506 A | 1/2010 |
| EP | 2042225 A1 | 4/2009 |
| JP | 03130522 | 6/1991 |
| JP | 2004060494 A | 2/2004 |
| JP | 2004100700 A | 4/2004 |
| JP | 2009-540212 A | 11/2009 |
| JP | 2010524677 A | 7/2010 |
| WO | 0029726 A1 | 5/2000 |
| WO | 0043469 A2 | 7/2000 |
| WO | 0174476 A1 | 10/2001 |
| WO | 2005016497 A1 | 2/2005 |
| WO | 2008011146 A1 | 1/2008 |
| WO | 2008030314 A1 | 3/2008 |
| WO | 2008075111 A1 | 6/2008 |
| WO | 2008132452 A2 | 11/2008 |
| WO | 2009100097 A2 | 8/2009 |
| WO | 2010097634 A1 | 9/2010 |

OTHER PUBLICATIONS

International Search Report dated Jul. 25, 2011, from PCT International Application No. PCT/IB2011/000491.
Chandler, Guy R. et al., "An Integrated SCR and Continuously Regenerating Trap System to Meet Future NOx and PM Legislation," SAE Technical Paper Series, Society of Automotive Engineers, 2000, pp. 1-6, vol. 2000-01-0188.
Auerbach, Scott M.; Carrado, Kathleen A.; Dutta, Prabir K.; Handbook of Zeolite Science and Technology, Chapter 3, CRC Press 2003.
Pu, Shu-Bin; Inui, Tomoyuki; Synthesis of 2,6-dimethylnaphthalene by methylation of methylnaphthalene on various medium and large-pore zeolite catalysts; Applied Catalysis A: General 146 (1996) 305-316.

* cited by examiner

*Primary Examiner* — Binh Q Tran
(74) *Attorney, Agent, or Firm* — Gary D. Mangels

(57) ABSTRACT

A diesel engine aftertreatment system comprises a diesel engine having an exhaust manifold and a filter substrate in direct connection with the exhaust manifold without any intervening catalyst, wherein the filter substrate comprises on its inlet side an SCR catalyst incorporating a non-coking molecular sieve.

18 Claims, No Drawings

CONTROL OF EMISSIONS

FIELD OF THE INVENTION

The present invention concerns improvements in the control of emissions, and more especially concerns improvements in the control of emissions from diesel (compression ignition) engines.

BACKGROUND OF THE INVENTION

Diesel engines are known for certain advantages including low fuel consumption, high torque and low carbon monoxide (CO) and carbon dioxide ($CO_2$) emissions. However, whilst diesel engines tend to produce lower amounts of regulated emissions than gasoline engines, they are also associated with some more difficult to manage emissions, particularly nitrogen oxides (NOx, essentially NO and $NO_2$) and particulate matter (PM). The other regulated pollutant from internal combustion engines is non-combusted or unburnt (including partially burnt) hydrocarbons (HC).

There are primarily two methods of reducing emissions from engines, the first being engine design and management, and the second being aftertreatment of the exhaust gases, although the combination is usually used. Exhaust gas aftertreatment has evolved by research and development of catalytic methods of treating the regulated emissions, and when used with electronic engine management is generally successful in meeting current emission standards. Nonetheless, ever-increasing emission regulations, combined with pressure to reduce fuel consumption and associated $CO_2$ emissions from environmental and global warming perspectives, continue to present challenges to the design of engines and aftertreatment systems.

The first catalytic aftertreatment introduced for vehicular diesel engines was a Diesel Oxidation Catalyst (DOC) comprising a Platinum Group Metal catalyst deposited on a flow-through ceramic or metal honeycomb substrate. Such DOCs are effective to oxidise CO and HC, and are now widely used. Additionally, such DOCs can be effective to reduce the mass of PM by simultaneously oxidising volatile fractions absorbed on a carbonaceous particle.

The use of Selective Catalytic Reduction (SCR) to reduce NOx to innocuous $N_2$ has been used for some 30 years in treating the output of thermal power plants, and is now in widespread use for coal-fired power plants and stationary gas turbine power plants and similar industrial plants with NOx emissions. SCR utilises the addition of a nitrogeneous reductant gas, primarily ammonia or an ammonia precursor such as urea, to the exhaust gas from the plant, and passing the resulting mixture over a catalyst known as an SCR catalyst. SCR systems are under development in USA, Europe and Japan for use in the afterteatment of exhausts from vehicular diesel engines, and are slowly being introduced into the market. Vehicular SCR systems are appreciably more difficult to manage than stationary systems, because of the varying quantity of exhaust gases, varying exhaust gas temperatures and the need to carry a supply of the reductant on the vehicle. Such SCR systems nonetheless appear to offer promise. For completeness, we mention that what may be termed "hydrocarbon SCR", where a hydrocarbon reductant such as diesel fuel itself, has also been proposed. Such hydrocarbon SCR appears to present rather more problems than the use of nitrogeneous reductants.

Several chemical reactions occur in an $NH_3$ SCR system, representing desirable reactions that reduce NOx to nitrogen. The dominant reaction is represented by reaction (1).

$$4NO+4NH_3+O_2 \rightarrow 4N_2+6H_2O \qquad (1)$$

Competing, non-selective reactions with oxygen can produce secondary emissions or may unproductively consume ammonia. One such non-selective reaction is the complete oxidation of ammonia, shown in reaction (2).

$$4NH_3+5O_2 \rightarrow 4NO+6H_2O \qquad (2)$$

Also, side reactions may lead to undesirable products such as $N_2O$, as represented by reaction (3).

$$4NH_3+5NO+3O_2 \rightarrow 4N_2O+6H_2O \qquad (3)$$

Commercial SCR catalysts are generally based on a zeolite, particularly a transition metal-modified zeolite (an aluminosilicate) such as Cu- or Fe-modified beta zeolite or Cu- or Fe-ZSM-5. These have a relatively wide temperature activity window. In general, Cu-based zeolite catalysts exhibit better low temperature NOx reduction activity than Fe-based zeolite catalysts.

However, in use, Cu- and Fe-Beta and -ZSM-5 zeolites have a number of drawbacks. They are susceptible to dealumination during high temperature hydrothermal ageing, resulting in a loss of acidity, especially with Cu-based zeolites. Both Beta and ZSM-5-based catalysts are also affected by hydrocarbons which become adsorbed on the catalysts at relatively low temperatures and are oxidised as the temperature of the catalyst system is raised, causing an exotherm which can damage the catalyst structure. This problem is particularly acute in vehicular diesel applications where significant quantities of hydrocarbon can be absorbed on the catalyst on cold-start. Both Beta and ZSM-5 zeolites are also prone to coking by hydrocarbons.

Our WO 2008/132452 describes alternative small pore zeolite catalysts containing at least one transition metal, such as silicoaluminophosphate. Hereinafter, however, "molecular sieve"-based catalysts will be used in the description of the present invention to include such catalysts as the silicoaluminophosphates (SAPO) having a zeolite-like structure. Certain authorities consider that the term "zeolite" should only be used for a silicoaluminate. We note that the SAPO-based catalysts of WO 2008/132452 are exemplified in a system comprising an upstream oxidation catalyst, an intermediate PM filter and a final SCR catalyst having an ammonia slip catalyst.

The removal of PM from diesel exhaust gases is generally realised by some form of filter or partial filter. A large number of filter designs have been proposed in the patent literature. Currently, the state of the art filter is a ceramic or ceramic-like wall flow filter, carrying a PM combustion catalyst, known as a catalysed soot filter (CSF). A number of variations on CSFs have been proposed, including the coating of the filter with a NOx absorber catalyst (NAC) or a SCR catalyst. As an example, we refer to, and incorporate herein the entire teaching of, WO 2005/01647. In this patent application, it is proposed to coat a filter substrate with an SCR catalyst composition. An essential feature of WO 2005/016497 is the positioning of a DOC upstream of the injection point for the SCR reductant, and hence upstream of the combined SCR and CSF.

JP Published Application 03130522 (Mitsubishi Heavy Industry) proposes a stationary diesel engine having a turbocharger, which is provided with an ammonia injector and an SCR catalyst fitted between the engine and the turbocharger. It is not believed that this design has been successfully introduced in the 20 years since it was proposed.

SUMMARY OF THE INVENTION

We have now surprisingly discovered a system design that does not include an upstream DOC, which is capable of meeting or exceeding emission regulations such as Euro VI over a relevant legislative emission cycle such as the New European Drive Cycle.

The present invention provides a diesel engine aftertreatment system comprising a diesel engine having an exhaust manifold and a filter substrate in direct connection with the exhaust manifold without any intervening catalyst, wherein the filter substrate comprises on its inlet side an SCR catalyst incorporating a non-coking molecular sieve.

The present invention also provides a method of aftertreatment of the exhaust gases from a diesel engine, comprising passing the exhaust gases directly, without passage through catalytic aftertreatment, in admixture with a nitrogeneous reductant through an SCR catalyst-coated filter means, wherein the SCR catalyst comprises a non-coking molecular sieve.

Preferably, the SCR catalyst-coated filter is close-coupled to the engine (that is, after the turbocharger), in a position which utilises both the heat in the exhaust gases leaving the engine and the $NO_2$ present in the engine-out exhaust gas. This is contrary to the conventional underfloor CSF position, in which heat (and consequently from lower temperatures, the ability of the CSF to make and re-make $NO_2$ when positioned in a cold underfloor location) is lost in the exhaust pipe between the exhaust manifold and the CSF. In the present invention, a further advantage from the close-coupled position in a light duty diesel vehicle, is that the hotter exhaust gas in that position acts more readily to drive off water/water vapour absorbed on the zeolite.

DETAILED DESCRIPTION OF THE INVENTION

The present invention may be applied in one form or another to diesel engines for light duty (car and commercial and similar vehicles), heavy duty (truck and bus and similar vehicles) and stationary (power generation). However, it is preferably applied to light duty diesel engines using common rail fuel injection or which by design or otherwise produce a relatively high proportion of $NO_2$ in the engine-out NOx, desirably at least 50% by vol. Common rail diesel injection is currently the system of choice for light duty diesel vehicles and is preferred in the present invention. The skilled person may modulate $NO_2$ levels to achieve desirable results in the present invention by varying a number of parameters, such as Exhaust Gas Recirculation ratio and size and timing of fuel injections. Other possibilities are on the horizon which may be considered, such as hydrogen injection, for example in a fuel reformate gas.

An aftertreatment system as proposed in WO 2005/016497 has a DOC upstream of the SCR-coated filter. We believe that this is disadvantageous in that the DOC actually removes $NO_2$ by reaction with HC, yet the $NO_2$ is a particularly useful component in the SCR reactions. Because of the removal of $NO_2$ by reaction with HC, it is generally necessary to re-create $NO_2$ before the treated exhaust gases are mixed with reductant and passed over the SCR catalyst. The re-creation of $NO_2$ requires high PGM loadings on a catalysed soot filter in such a system, which is an economic penalty. Additionally, the position of the SCR-catalyst downstream of the DOC requires light-off strategies to ensure that both the SCR catalyst and the filter itself reach the appropriate light-off temperatures; most if not all of such strategies require the combustion of fuel to raise gas/catalyst temperatures, and thus result in a fuel penalty. In contrast, the system of the present invention utilises the heat contained in the engine-out exhaust gas, so that there is little or no requirement for costly light-off strategies.

The use of an SCR-coated filter without a preceding DOC, in accordance with the invention, provides rapid light off for the SCR reaction and reduces the loss of heat for the subsequent PM combustion of PM trapped on the filter.

The system of the invention may desirably include an oxidation catalyst; which may be a separate component or is preferably an additional coating on the filter substrate, downstream of the SCR catalyst, for example preferably coated on the outlet channels of the filter substrate. A coating may be applied to the entire outlet channel length, or to a part only of the outlet channels. Such an oxidation catalyst is preferably a precious metal catalyst formulated to light off at much lower temperatures than a conventional DOC, which is exposed to the exhaust gases. Such low temperature light-off DOC catalysts are available to the skilled person. We refer also, for example, to the technology disclosed in Johnson Matthey's U.S. Pat. No. 5,776,417 and U.S. Pat. No. 5,939,028 which relates to low temperature light-off gasoline engines. Other suitable low light-off oxidation catalysts may be formulated by modifying a Pd:Rh three-way catalyst composition to increase the Pd loading, which has been found to reduce light-off in respect of the methane component of HC. Other variations are available to the skilled person.

Because the system of the invention uses less SCR coating than in a conventional system, slip of ammonia may occur. If this is observed, it is recommended that an ammonia slip catalyst is included as a separate component, or preferably as a final stripe coating on the outlet channels of the filter substrate, to avoid any release of pungent ammonia to the atmosphere.

It is a requirement of the present invention that the SCR catalyst used incorporates a non-coking molecular sieve. The requirement to be "non-coking" is to be understood as exhibiting no or only marginal amounts of poisoning of the catalytic activity or back-pressure increase caused by the formation of carbon or carbonaceous material on the molecular sieve under the conditions experienced in use. Thus, present indications are that small pore molecular sieves, which prevent the larger HC molecules which cause most coking problems from entering the molecular sieve pores, are preferred in the present invention. Also, since acidic sites on a molecular sieve increase coke formation, this should be taken into account when selecting a suitable molecular sieve. Other issues to be considered when applying the present invention are that a small pore molecular sieve exhibits less storage of HC at lower temperatures, generally below 250° C.; excessive HC storage can result in severely constricted or blocked pores in a molecular sieve.

Whilst suitable non-coking molecular sieves can be selected by conventional trial and error, the SAPO-type materials described in the invention of WO 2008/132452 are presently believed to be useful in the present invention.

The SCR catalyst may include, for example by being admixed with, a NOx trapping catalyst. Such NOx-trapping catalyst may be used to absorb NOx under those conditions under which the SCR catalyst is not fully effective, for example on start-up or during low speed driving conditions when the exhaust gas temperature is low. A NOx-trapping catalyst may be regenerated with ammonia.

It will be understood that the system includes suitable injection means for nitrogeneous reductant, as in all SCR systems. The reductant injection may be controlled in conventional manner. It is preferred that the reductant is $NH_3$.

It is believed to be an advantage of the present invention that the position of the SCR-coated filter to receive the hot exhaust gases from the engine directly, in addition to facilitating the SCR reaction, increases regeneration possibilities of the filter.

The filter may be any suitable filter structure, which may be coated or partially coated with SCR catalyst according to methods known per se, which methods may also be used for the deposition of other components also. It is presently believed that the ceramic-type wall-flow filter is the most convenient filter structure. The SCR catalyst may be coated by way of an upstream inlet partial coating (or "stripe") or may be coated on all of the inlet channels. The filter preferably includes a soot combustion catalyst, and the skilled person knows of suitable catalysts. The soot combustion catalyst may be coated on the filter structure in the downstream portion of each inlet channel, or may have been deposited as an initial coating prior to the deposit of the SCR catalyst, so that the SCR catalyst overlies the soot combustion catalyst.

The present invention and aspects of it may be adapted by the skilled person to meet specific requirements and to utilise the latest materials available, without departing from the present inventive concepts.

What is claimed:

1. A diesel engine after-treatment system comprising
   a light duty diesel engine having common rail fuel injection, an exhaust manifold and a filter substrate in direct connection with the exhaust manifold wherein the system is free of a diesel oxidation catalyst disposed between the exhaust manifold and the filter substrate,
   wherein the filter substrate comprises on its inlet side an SCR catalyst incorporating a non-coking small pore molecular sieve and comprises on its outlet side an oxidation catalyst containing a precious metal.

2. A system according to claim 1, wherein the molecular sieve is a silicoaluminophosphate-based molecular sieve.

3. A system according to claim 1, wherein the filter substrate is close-coupled to the engine.

4. A system according to claim 1, comprising additionally an ammonia slip catalyst.

5. A method for treating combustion exhaust gas from a light-duty diesel engine utilizing common rail fuel injection, the method comprising passing the exhaust gas, without passage through a diesel oxidation catalyst, in admixture with a nitrogeneous reductant through a filter substrate comprising on its inlet side an SCR catalyst incorporating a non-coking small pore molecular sieve and comprising on its outlet side an oxidation catalyst containing a precious metal.

6. The method of claim 5, wherein said passing occurs at a temperature of at least 250° C.

7. The system of claim 1, wherein said SCR catalyst is free from PGMs.

8. The system of claim 4, wherein said ammonia slip catalyst is coated on outlet channels of the filter substrate.

9. The system of claim 1, wherein the oxidation catalyst is an ammonia slip catalyst.

10. The system of claim 1, wherein the oxidation catalyst is a coated stripe on the outlet side of the filter.

11. The system of claim 1, wherein the oxidation catalyst is a coated on the entire outlet side of the filter.

12. The system of claim 1, further comprising a NOx trapping catalyst.

13. The system of claim 1, further comprising a reductant injector.

14. The system of claim 1, wherein said filter is a wall flow filter.

15. The system of claim 1, further comprising a soot oxidation catalyst.

16. The system of claim 1, wherein the SCR catalyst is coated on a portion of the filter inlet.

17. The system of claim 1, wherein the SCR catalyst is coated on the entire filter inlet.

18. The system of claim 1, wherein the outlet side comprises an oxidation catalyst containing palladium.

* * * * *